Figure 3:
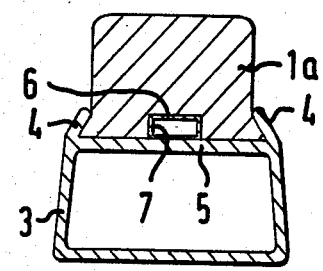

United States Patent [19]

Ferguson

[11] Patent Number: 4,578,546

[45] Date of Patent: Mar. 25, 1986

[54] ELECTRIC TRACTION CURRENT-COLLECTOR

[75] Inventor: Ian C. Ferguson, Swansea, Wales

[73] Assignee: Morganite Electrical Carbon Limited, Swansea, Wales

[21] Appl. No.: 514,803

[22] PCT Filed: Oct. 21, 1982

[86] PCT No.: PCT/GB82/00300

§ 371 Date: Jun. 20, 1983

§ 102(e) Date: Jun. 20, 1983

[87] PCT Pub. No.: WO83/01419

PCT Pub. Date: Apr. 28, 1983

[30] Foreign Application Priority Data

Oct. 22, 1981 [GB] United Kingdom ................. 8131912

[51] Int. Cl.⁴ .......................... B60L 5/20; B60L 5/32; B60L 5/14
[52] U.S. Cl. ...................................... 191/87; 191/59.1
[58] Field of Search ...................... 191/45 R, 59.1, 65, 191/85–94

[56] References Cited

U.S. PATENT DOCUMENTS 3,394,365  7/1968  Nealis .............................. 191/87 X

FOREIGN PATENT DOCUMENTS 1275742  5/1972  United Kingdom ................. 191/87
1374972  11/1974  United Kingdom .

Primary Examiner—Robert B. Reeves
Assistant Examiner—David F. Hubbuch
Attorney, Agent, or Firm—William R. Hinds

[57] ABSTRACT

An electric traction current-collector has a carbon current-collector block (1) housing a rupturable tubular container (7 1) for air under pressure applied through a pneumatic control system for a pantograph or other carrier so that loss of air pressure due to rupture of the container causes the current-collector block to be retracted. The container (7) is so thin that, if it is not completely housed and supported, it bursts under the applied air pressure and consequently any defect in the carbon block which spoils complete support of the container causes retraction of the current-collector.

3 Claims, 4 Drawing Figures

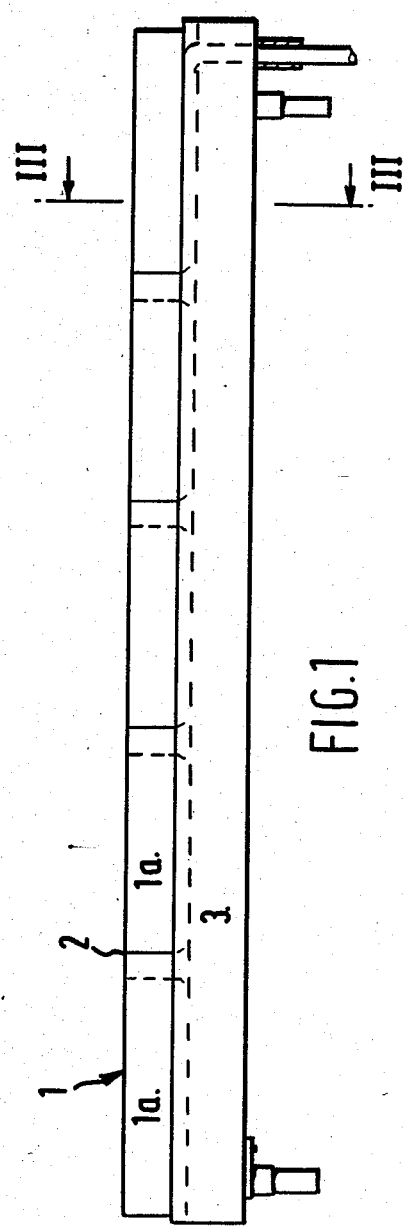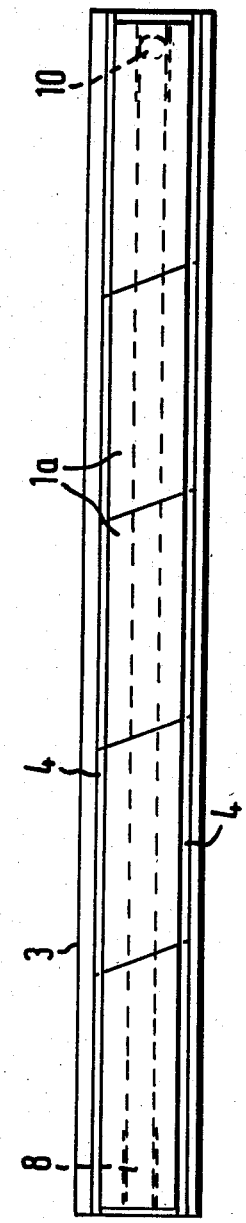

ELECTRIC TRACTION CURRENT-COLLECTOR

This invention relates to electric traction current-collectors and is an improvement on the invention of United Kingdom Pat. No. 1 374 972 (Morganite Carbon Limited).

In the earlier invention of that Patent, a carbon current-collector block, for contacting a railway overhead power conductor, houses a rupturable tubular container for fluid with means for connection to pressure-fluid operated carrier mechanism for the block, so that, on rupture of the container, the collector block is retraced from the conductor. According to the present invention, the container is so distensible and is charged with fluid under such pressure that the container will burst if it is not completely supported by its surrounding housing.

The container may be housed completely within the carbon block or in a channel between the carbon block and a shoe or other holder.

In use of both the earlier invention and the present invention, rupture or bursting of the fluid container causes such loss of pressure that the carrier mechanism, generally known as a "pantograph", is operated to retract the current-collector block from contact with the overhead conductor and thus avoid damage to the conductor by a defective collector.

The invention is not limited to a current-collector block and carrier for an overhead conductor and may be applied to a carbon current-collector on a carrier loaded down by fluid pressure on to a conductor rail.

In the earlier invention, rupture of the fluid container is consequent only on breakage or excessive wear of the carbon block directly causing the rupture or exposing the container so that it becomes ruptured by encountering the conductor.

In the present invention, the distensible container under pressure is susceptible to any defect in complete support by the surrounding carbon block so that a fault in construction or assembly or an incipient failure, such as propagation of an opening or crack in the carbon short of actual breakage, will cause bursting of the container and consequent retraction of the pantograph.

In order to limit the vulnerability of the container to conditions affecting directly the operation of the current-collector block as such, the means for connection of the container to the pantograph, or other carrier mechanism, comprise a substantially inextensible tubular connector joined to the container within its supporting housing so that no distensible part of the container extends outside the housing.

The material of the distensible container is preferably a thin-walled tube of a silicone rubber, for example of 4.0 mm internal diameter and 0.35 mm to 0.5 mm wall thickness to be charged with air at a pressure well above 30 p.s.i. (pounds per square inch). A tube of silicone rubber of 0.35 mm wall thickness will burst if unsupported at 15 p.s.i. and a 0.5 mm thickness tube at 20–30 p.s.i. A suitable operating pressure in practice is 150 p.s.i. which is usually available from the air compressor of a locomotive.

Figure 4:
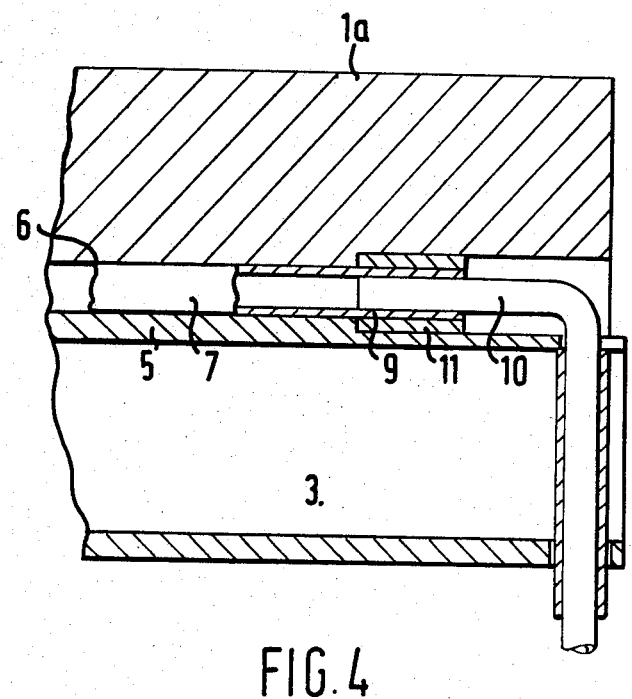

The invention is illustrated by way of example on the accompanying drawings, in which:

FIG. 1 is a side elevation and FIG. 2 is a plan of a carbon current-collector block and carrier shoe according to the invention, FIG. 3 is a cross-section on the line III—III of FIG. 1, and FIG. 4 is a fragmentary longitudinal section showing a tubular connector for supplying air under pressure to the distensible tube.

As shown by FIGS. 1 and 2, the carbon block 1 is made in sections 1a, with closely-fitting oblique joints 2, held in a shoe 3, which may be of aluminum, of box-section with flanges 4 holding a dovetail-section base of the carbon block tightly against a web plate 5.

Along the middle of the base of the carbon block there is a rectangular channel 6 which, together with the shoe plate 5, provides a housing for a thin distensible tube 7, such as of silicone rubber as mentioned above.

One end of the tube 7 is closed at 8 and the other end 9 fits closely over an air-supply connector pipe 10, of metal or rigid plastics material, around which it is sealed air-tight by a heat-shrunk clamping band 11.

Air under pressure is supplied to the tube 7 through the pipe 10 from a pantograph or other carrier pneumatic control system (not shown) which operates to maintain the carbon block against its conductor only so long as a given air pressure is maintained in the pneumatic system. Should air pressure drop due to rupture of the tube 7, or otherwise, the control system operates to cause retraction of the carbon block from its conductor. A suitable control system is described in the above-mentioned patent specification No. 1 374 972 and may be used in conjunction with the present invention.

The housing of the tube 7 by the channel 6 and shoe plate 5 is so complete that the tube is supported throughout against distension beyond its bursting point by the applied air pressure.

Should there be any distrubance of the support of the tube 7 by its housing, for example cracking, breakage or displacement of a carbon block section 1a, such that the tube 7 is no longer fully supported, the tube 7 will expand locally and burst. The consequent loss of air pressure in the control system will cause retraction of the carbon block from its conductor.

I claim:

1. In a carbon current-collector block being a component of means for contacting and collecting electric power from a railway power conductor, said block comprising means housing a tubular contrainer for fluid, means for fluid connection of said container to carrier means for said block, said carrier means being operable by fluid pressure to maintain said block in contact with the conductor or to effect retraction of the block from the conductor on occurrence of change of fluid condition within the container due to rupture thereof; the improvement comprising the provision of a tubular container which is distensible to bursting under a given pressure of fluid supplied through said fluid connection means, said fluid connection means being substantially non-distensible at said given fluid pressure and being connected to said container within said housing means so that no distensible part of said container extends outside said housing, and said housing means forming a complete support and enclosure of said container, limiting distention of said container within said housing means and preventing bursting of said container only if and so long as said support thereof is complete, such that a construction or assembly fault, a crack or other incipient failure or other defect in complete support results in bursting of the container and retraction of the block from the conductor without requiring rupture of the container directly by the conductor or some other agency.

2. A carbon current-collector block as claimed in claim 1, the block comprising carbon block sections, with closely fitting joints, held in a shoe which holds the block tightly against a web plate, and the block having a channel which, together with said web plate, comprises said housing means; wherein a thin distensible tube forming said container is distended to conform to said channel and web plate under said given fluid pressure.

3. A carbon current-collector block as claimed in claim 2, wherein said tube is of silicone rubber of from 0.35 to 0.5 mm wall thickness, which will burst if unsupported at an internal pressure of from 15 to 30 pounds per square inch.

* * * * *

UNITED STATES PATENT AND TRADEMARK OFFICE
CERTIFICATE OF CORRECTION

PATENT NO. : 4,578,546
DATED : March 25, 1986
INVENTOR(S) : Ian C. Ferguson

It is certified that error appears in the above—identified patent and that said Letters Patent is hereby corrected as shown below:

In Column 1, line 13, "retraced" is corrected to --retracted--.

In Column 2, line 34, "distrubance" is corrected to --disturbance--.

In Column 2, line 46, "contrainer" is corrected to --container--.

Signed and Sealed this

Twenty-ninth Day of July 1986

[SEAL]

Attest:

Attesting Officer

DONALD J. QUIGG

Commissioner of Patents and Trademarks